(12) United States Patent
Suzuki et al.

(10) Patent No.: US 8,174,682 B2
(45) Date of Patent: May 8, 2012

(54) SHAPE MEASURING INSTRUMENT WITH LIGHT SOURCE CONTROL

(75) Inventors: Satoshi Suzuki, Kita-ku (JP); Katsuhiro Sato, Kita-ku (JP); Yoichi Sano, Kita-ku (JP)

(73) Assignees: Leica Geosystems AG, Heerbrugg (CH); Hexagon Metrology Kabushiki Kaisha, Sagamihara-Shi (JP)

( * ) Notice: Subject to any disclaimer, the term of this patent is extended or adjusted under 35 U.S.C. 154(b) by 140 days.

(21) Appl. No.: 12/738,691

(22) PCT Filed: Jul. 29, 2008

(86) PCT No.: PCT/EP2008/059954
§ 371 (c)(1),
(2), (4) Date: Jun. 18, 2010

(87) PCT Pub. No.: WO2009/049939
PCT Pub. Date: Apr. 23, 2009

(65) Prior Publication Data
US 2010/0271616 A1    Oct. 28, 2010
US 2011/0075126 A2    Mar. 31, 2011

(30) Foreign Application Priority Data
Oct. 18, 2007    (JP) .................................. 2007-270974

(51) Int. Cl.
*G01C 3/18* (2006.01)
(52) U.S. Cl. ...................................... 356/5.01; 356/5.09
(58) Field of Classification Search .................. 356/5.01, 356/5.09
See application file for complete search history.

(56) References Cited

U.S. PATENT DOCUMENTS

| 6,288,382 B1 | 9/2001 | Ishihara |
| 6,603,593 B2* | 8/2003 | Fidric et al. ..................... 359/334 |
| 7,339,148 B2* | 3/2008 | Kawano et al. ............ 250/201.3 |
| 2001/0043336 A1* | 11/2001 | Shitamich ..................... 356/614 |
| 2003/0058455 A1* | 3/2003 | Ebihara et al. ................ 356/601 |
| 2006/0012871 A1 | 1/2006 | Funk et al. |

FOREIGN PATENT DOCUMENTS

| JP | 60-136714 | 7/1985 |
| JP | 62-000804 | 1/1987 |
| JP | 09-218020 | 8/1997 |
| JP | 2001-042239 | 2/2001 |
| JP | 2004-333369 | 11/2004 |

* cited by examiner

*Primary Examiner* — Thomas Tarcza
*Assistant Examiner* — Antoine J Bedard
(74) *Attorney, Agent, or Firm* — Maschoff Gilmore & Israelsen

(57) ABSTRACT

An optical system of a shape measuring instrument includes a laser diode, a first optical system irradiating an object to be measured with laser beam, a second optical system focusing reflected light from the object to be measured, and a CCD line sensor portion for detecting a laser beam from the second optical system, where the first optical system includes an optical path displacing unit for displacing an optical path for laser beam, the optical path displacing unit includes a glass plate rotating about a rotating axis extending in a direction perpendicular to a displacement plane of the optical path, a rotating unit for the glass plate, and a rotating unit controller, and the rotating unit controller causes a rotation angle of the rotating unit to coincide with a rotation angle of the rotating unit obtained when the maximum value of an amount of light received by the CCD line sensor according to rotation of the rotating unit is measured by the rotating unit controller.

6 Claims, 4 Drawing Sheets

Viewed from above optical axis surface

Optical axis is shifted according to rotation of glass plate

SHAPE MEASURING INSTRUMENT WITH LIGHT SOURCE CONTROL

The present invention relates to a shape measuring instrument utilizing a non-contact sensor.

BACKGROUND

A conventional shape measuring instrument utilizing a non-contact sensor includes a shape measuring device which utilizes a non-contact sensor to measure a shape of a surface of an object and outputs measurement data of the shape, a computer main body which processes the measurement data outputted from the shape measuring device, and a display device which is controlled by the computer main body to display an image of the object.

FIG. 8 is a schematic diagram of an optical system of the shape measuring device. An object to be measured is irradiated with outgoing light emitted from a laser diode 111 via a beam expander 112, a first mirror 113, a second mirror 114, and a third mirror 115. Returning light reflected by a surface of the object to be measured enters a CCD line sensor portion 118 which is a non-contact sensor via the third mirror 115, the second mirror 114, a fourth mirror 116, and an imaging lens portion 117. Incidentally, the shape measuring device can scan the surface of the object to be measured by rotating a whole case (not shown) accommodating the optical system about X axis or translating the optical system along Y axis shown in FIG. 8 and rotating the third mirror 115 about Y axis.

FIG. 9 is a conceptual diagram showing a measurement principle of the shape measuring instrument. A surface of an object to be measured is irradiated with laser beam emitted from the laser diode 111 and returning light reflected by the surface of the object to be measured is concentrated by an imaging lens 117a of the imaging lens portion 117 to be focused on a line sensor 118a of the CCD line sensor portion 118. An image location of returning light measured by the line sensor 118a is outputted from the shape measuring device as measurement data. The computer main body utilizes a triangle measurement principle used for distance measurement to calculate a shape of the surface of the object to be measured based upon the measurement data.

In the shape measuring device, the position of the surface of the object to be measured is measured by measuring a displacement amount of the image location of returning light on the line sensor 118a of the CCD line sensor portion 118, but when the image location of the returning light is focused at a position deviated from the line sensor 118a (a position in a direction forming an angle of 90° to an extending direction of the line sensor 118a), the amount of light which can be received by the line sensor 118a lowers, which results in impossibility of measurement. The deviation of the image location of returning light is caused by deviation of an optical axis of the optical system of the shape measuring device.

When such optical axis deviation occurs, maintenance for performing position adjustment of the above-mentioned respective members configuring the optical system of the shape measuring device or the CCD line sensor portion 118 is required.

However, since the maintenance work must be performed by a skilled Operator or worker precisely, which results in such a problem that much cost and time are required for the maintenance work.

SUMMARY

In view of these circumstances, an object of the present invention is to provide a shape measuring instrument, particularly a three dimensional shape measuring instrument, having a shape measuring device which allows correction of optical axis deviation without conducting maintenance work.

According to an aspect of the present invention, there is provided a shape measuring instrument comprising: a laser diode for emitting laser beam; a first optical system irradiating a surface of an object to be measured with laser beam emitted from the laser diode; a second optical system for focusing laser beam which is reflected from the surface of the object to be measured; and a CCD line sensor portion for detecting an image location of the laser beam from the second optical system, wherein the first optical system has an optical path displacing unit for displacing an optical path of laser beam such that laser beam from the second optical system is properly focused on the CCD line sensor portion; the optical path displacing unit includes a glass plate rotating about a rotating axis extending in a direction perpendicular to a displacement plane of the optical path, a rotating unit for rotating the glass plate, and a rotating unit controller for controlling the rotating unit; and the rotating unit controller measures change of the amount of light received by the CCD line sensor portion according to rotation of the rotating unit and causes a rotation angle of the rotating unit to coincide with a rotation angle of the rotating unit obtained when the maximum value of the amount of light received by the CCD line sensor portion is measured.

It is further preferable in the shape measuring instrument according to the present invention that the rotating unit is driven by a motor, preferably an ultrasonic transducer. Rotation is a general expression and therefore including pivoting movements relative to an axis of rotation.

The shape measuring instrument, particularly the three dimensional shape measuring instrument, according to the present invention described in claim 1 is configured such that the first optical system includes the optical path displacing unit, and change of the amount of light received by the CCD line sensor portion according to rotation of the rotating unit is measured by the rotating unit controller, so that a rotation angle of the rotating unit is caused to coincide with a rotation angle of the rotating unit obtained when the maximum value of the amount of light received by the CCD line sensor portion is measured. Accordingly, since an optical axis deviation of the optical system of the shape measuring device can be corrected, it is unnecessary to conduct maintenance work for performing position adjustment of the CCD line sensor portion conducted conventionally.

The shape measuring instrument according to the present invention is driven by the ultrasonic transducer. Accordingly, a stopping state of the rotating unit can be maintained at a vibration stopping time of the ultrasonic transducer.

An embodiment of the present invention will be explained in detail below with reference to FIG. 1 to FIG. 7. An optical system 1 of a three-dimensional shape measuring instrument according to the present embodiment includes a laser diode 2 for emitting laser beam, a first optical system for irradiating a surface of an object to be measured with laser beam emitted from the laser diode 2, a second optical system for focusing the laser beam which is reflected from the surface of the object to be measured, and a CCD line sensor portion 12 for detecting an image location of laser beam from the second optical system, where the first optical system includes an optical path displacing unit 20 for displacing an optical path of laser beam such that laser beam from the second optical system is properly focused on the CCD line sensor portion 12, the optical path displacing unit 20 includes a glass plate 21 rotating about a rotating axis extending in a direction perpendicular to a displacement plane of the optical path, a rotating unit for rotating the glass plate 21, and a rotating unit controller (not shown) for controlling the rotating unit; and the rotating unit controller measures the change of amount of light received by the CCD line sensor portion 12 according to rotation of the rotating unit and causes a rotation angle of the rotating unit to coincide with a rotation angle of the rotating unit obtained when the maximum value of an amount of light received by the CCD line sensor portion 12 is measured. Incidentally, in the present embodiment, the first optical system is configured to include a beam expander 3, the optical path displacing unit 20, a first mirror 4, and a second mirror 5, and the second optical system is configured to include a third mirror 7, a fourth mirror 8, a fifth mirror 9, an imaging lens portion 10, and a sixth mirror 11.

The shape measuring instrument according to the present embodiment mainly includes a shape measuring device which uses the CCD line sensor portion 12 to measure a shape of a surface of an object to be measured, particularly a three dimensional shape, and output data of the measurement, a computer main body which processes the data of measurement outputted from the shape measuring device, and a display device which displays an image of the object to be measured, particularly a three dimensional image, under control of the computer main body. Incidentally, the computer main body stores a software configuring the rotating unit controller described later therein.

DETAILED DESCRIPTION

FIG. 1 is a schematic perspective diagram showing an optical system of the shape measuring device of the shape measuring instrument according to the embodiment. After outgoing light from the laser diode 2 passes through a glass plate 21 of the optical path displacing unit 20 described later, a surface of an object to be measured is irradiated with the outgoing light through the first optical system. In the first optical system, the beam expander 3 is an optical system for maintaining a small spot such that a laser beam diameter falls within a measurement distance range, and the first mirror 4 and the second mirror 5 are provided for changing the direction of the laser beam.

The second mirror 5 is provided at one end of a rotating shaft of a swinging motor 6, and it is rotated about Y axis shown in FIG. 1. An irradiation range of laser beam to a surface of an object to be measured can be moved in a horizontal direction in FIG. 1 according to rotation of the second mirror 5. The third mirror 7 described later is also provided at the other end of the rotating shaft of the swinging motor 6, and it is rotated at the same angle as that of the second mirror 5. Incidentally, the optical system of the shape measuring device according to the present embodiment can perform scanning in a vertical direction of a surface of an object to be measured by rotating the whole case (not shown) accommodating the optical system about X axis or translating the optical system along Y axis shown in FIG. 1.

In the second optical system for focusing laser beam which is reflected from a surface of an object to be measured, the third mirror 7, the fourth mirror 8, the fifth mirror 9, and sixth mirror 11 are provided for changing the direction of the laser beam which is returning light, and the imaging lens portion 10 is disposed so as to concentrate returning light and focus the same on the line sensor 12a of the CCD line sensor portion 12. As described above, the third mirror 7 is rotated about Y axis shown in FIG. 1 by the swinging motor 6, and an incident angle of returning light of laser beam reflected on the surface of object to be measured is provided to the third mirror 7 according to an irradiation angle of laser beam to the surface of the object to be measured by linkage with the second mirror 5. Incidentally, the imaging lens portion 10 has an imaging lens 10a. The CCD line sensor portion 12 has a line sensor 12a for measuring an image location of returning light.

FIG. 2 and FIG. 3 show a measurement principle of the shape measuring instrument. After the laser beam emitted from the laser diode 2 passes through the glass plate 21 in the optical path displacing unit 20 for displacing an optical path of laser beam, a surface of an object to be measured is irradiated with the laser beam, and returning light reflected by the surface of the object to be measured is concentrated by the imaging lens 10a of the imaging lens portion 10 to be focused on the line sensor 12a of the CCD line sensor portion 12. The image location of the returning light measured by the line sensor 12a is outputted as measurement data from the shape measuring device. The computer main body utilizes a triangle measurement principle used for distance measurement to calculate a shape, particularly a three dimensional shape, of the surface of the object to be measured based upon the measurement data.

FIG. 6 is a schematic perspective view showing a configuration of the optical path displacing unit 20 according to the present embodiment. The optical path displacing unit 20 comprises the glass plate 21, a fulcrum portion 22 which supports the glass plate 21 and configures a rotating axis for the glass plate 21, said axis forming an angle of 90° to the optical path, an arm 23 fixed to the fulcrum portion 22 at an one end thereof, a Protrusion 24 coupled to the other end of the arm 23, a sliding piece 25 fixed to the Protrusion 24, a vibration shaft 26 penetrating the sliding piece 25 and causing the sliding piece 25 to slide, an oscillator 27 which is a ultrasonic transducer for vibrating the vibration shaft 26, and the rotating unit controller. The fulcrum portion 22, the arm 23, the protrusion 24, the sliding piece 25, the vibration shaft 26, and the oscillator 27 configure the rotating unit. The sliding piece 25, the vibration shaft 26, and the oscillator 27 configure a ultrasonic motor. The sliding piece 25 functions as a rotor, while the vibration shaft 26 and the oscillator function as a Stator. Since the ultrasonic motor is used, the sliding piece 25 comes in close contact with the vibration shaft 26 at a vibration stopping time, so that a stopping state can be maintained.

When current is fed to the oscillator 27, the oscillator 27b vibrates. Vibration of the oscillator 27 vibrates the vibration shaft 26 so that the sliding piece 25 moves along the vibration shaft 26 according to vibration of the vibration shaft 26. Incidentally, when current feeding to the oscillator 27 is stopped, movement of the sliding piece 25 is stopped, and the vibration shaft 26 is maintained at its stopped position. Control of current feeding to the oscillator 27 is performed by the rotating unit controller described later.

The arm 23 rotates the fulcrum 22 by the protrusion 24 according to movement of the sliding piece 25. The glass plate rotates about the fulcrum portion 22 in an arrow direction shown in FIG. 6 according to rotation of the fulcrum portion 22.

FIG. 4 and FIG. 5 are explanatory diagrams showing displacement of an optical path and an image location performed by the optical path displacing unit 20. The optical path displacing unit 20 is provided for preventing imaging at a position deviated from the line sensor 12a of the CCD line sensor portion 12 (a position in a direction forming an angle of 90° to an extending direction of the line sensor 12a).

As shown in FIG. 4, when the glass plate 21 is rotated about the fulcrum portion 22 as a rotating shaft according to rotation of the fulcrum portion 22, laser beam emitted from the laser diode 2 displaces in parallel with the optical axis of the laser diode 2. As shown in FIG. 5, the imaging location of the laser beam displaces in a direction forming an angle of 90° to the extending direction of the line sensor 12a of the CCD line sensor portion 12.

FIG. 7 is a graph diagram showing change of an amount of light received by the line sensor 12a when the image location of laser beam displaces according to rotation of the glass plate 21. Respective graphs show amounts of light at respective image locations shown by A, B, C, D, and E in FIG. 5, from which it can be understood that the amount of received light at the image location C positioned on the line sensor 12a shows the maximum value.

Control of rotation of the glass plate 21 of the rotating unit is performed by the rotating unit controller. In the present embodiment, the rotating unit controller is software stored in the computer main body configuring the shape measuring instrument. The computer main body includes two main Operation modes, one thereof being a shape measuring mode performing shape measurement and the other thereof being an optical axis correcting mode. When a user operates the computer main body to select the optical axis correcting mode, the rotating unit controller measures change of an amount of light received by the CCD line sensor portion 12 according to rotation of the rotating unit and causes a rotation angle of the rotating unit to coincide with a rotation angle of the rotating unit obtained when the maximum value of the amount of light received by the CCD line sensor portion 12 is measured.

Operation effect of the present embodiment will be explained below.

In the shape measuring instrument according to the present embodiment, the optical path displacing unit 20 is provided in the first optical system, and when a user operates the computer main body to select the optical axis correcting mode, the rotating unit controller measures the change of an amount of light received by the CCD line sensor portion 12 according to rotation of the rotating unit and causes a rotation angle of the rotating unit to coincide with a rotation angle of the rotating unit obtained when the maximum value of the amount of light received by the CCD line sensor portion 12 is measured. Accordingly, since an optical axis deviation of the optical system 1 of the shape measuring device can be corrected, maintenance work for performing position adjustment of the CCD line sensor portion performed conventionally becomes unnecessary.

Further, in the shape measuring device according to the present embodiment, the rotating unit is driven by the oscillator 27 which is the ultrasonic transducer. Accordingly, the sliding piece comes in close contact with the vibration shaft 26 at a vibration stopping time so that a stopping state can be maintained. Instead of an ultrasonic transducer any other motor or driving device for positioning the glass plate under defined rotational angles can be used.

EXPLANATION OF REFERENCE NUMERALS

Figure 1:
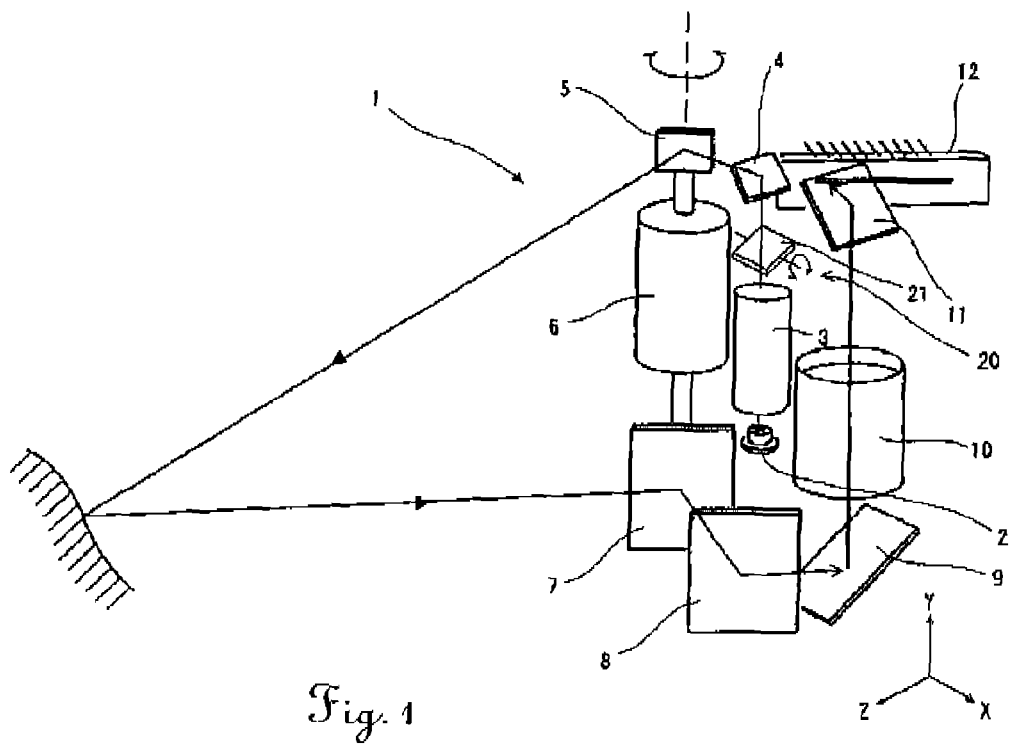
FIG. 1 is a schematic diagram of an optical system of a shape measuring device of a shape measuring instrument according to an embodiment of the present invention.
Figure 2:
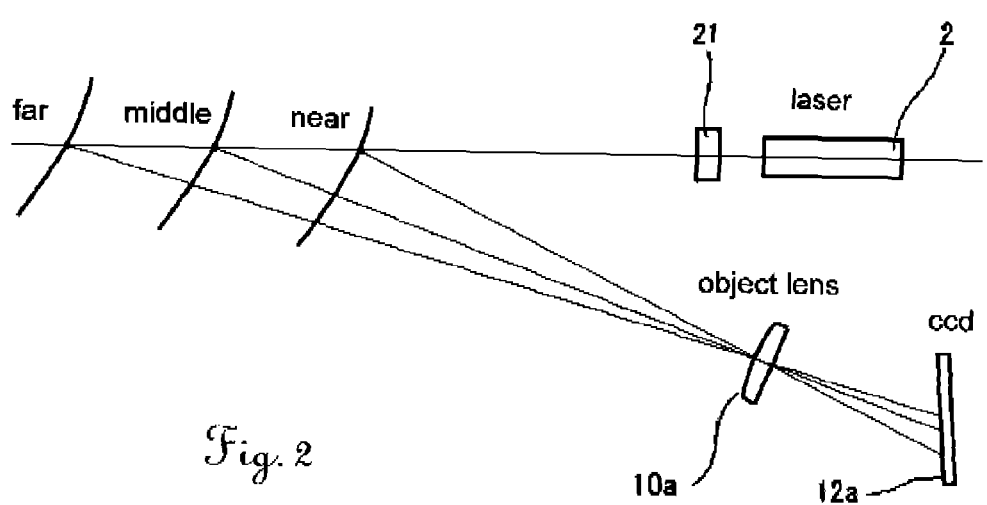
FIG. 2 is an explanatory diagram showing a measurement principle of the shape measuring instrument shown in FIG. 1.
Figure 3:
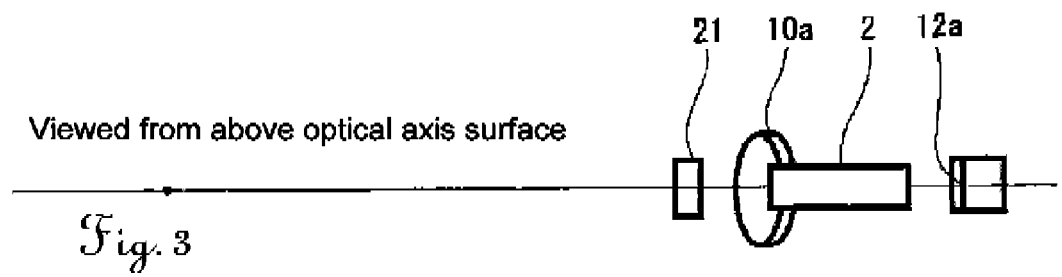
FIG. 3 is an explanatory diagram of the explanatory diagram shown in FIG. 2 as viewed from the above.
Figure 4:
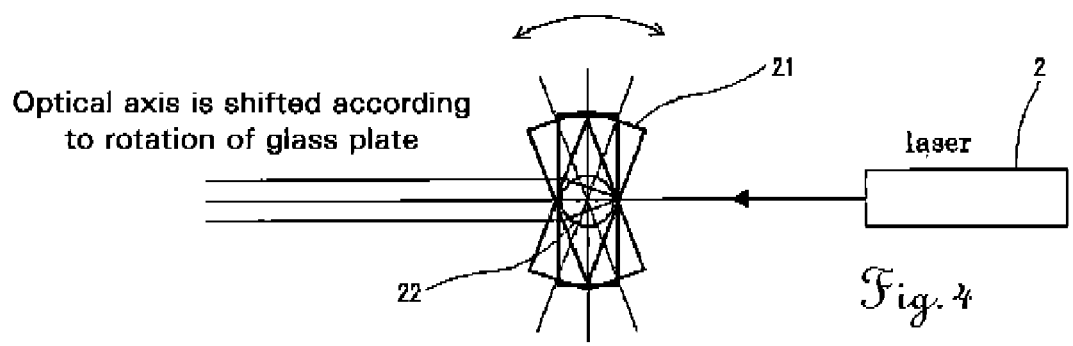
FIG. 4 is an explanatory diagram showing a rotating State of a glass plate 21 of a rotating unit in the shape measuring instrument shown in FIG. 1 and displacement of an optical axis thereof.
Figure 5:
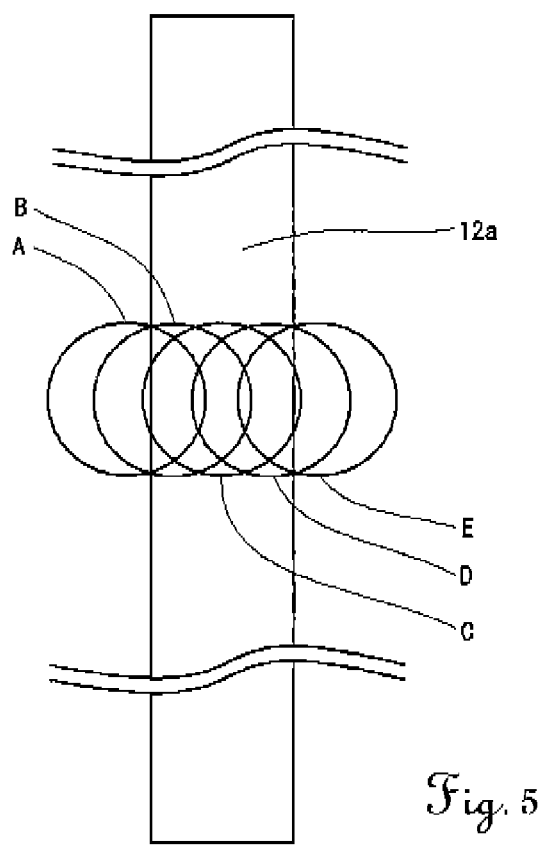
FIG. 5 is an explanatory diagram showing a displacement of an image location on a line sensor 12a in the shape measuring instrument shown in FIG. 1.
Figure 6:
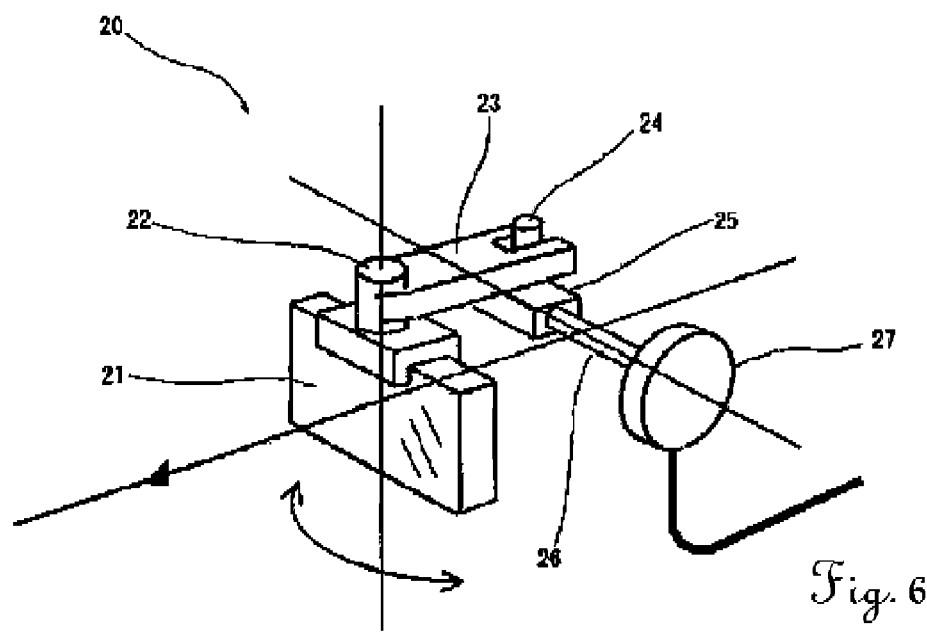
FIG. 6 is a schematic perspective diagram of the rotating unit in the shape measuring instrument shown in FIG. 1.
Figure 7:
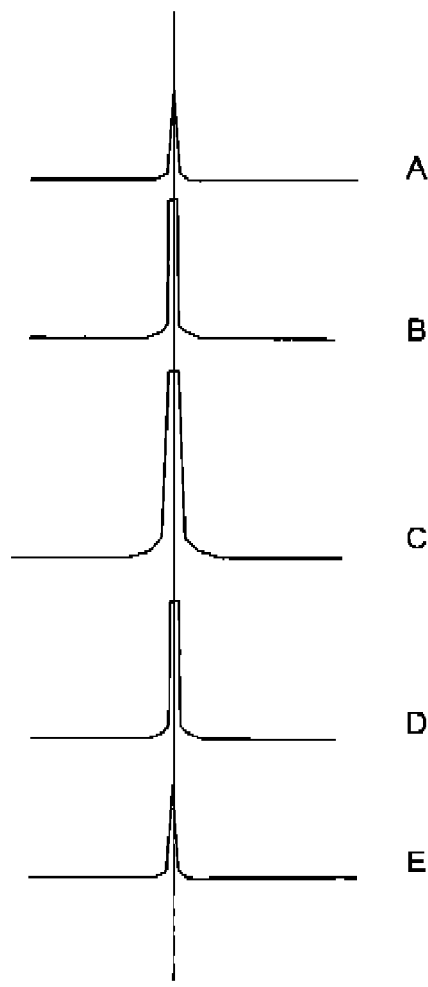
FIG. 7 is a graph diagram showing the change of an amount of light received by the line sensor 12a when an image location of laser beam is displaced according to rotation of the glass plate 21 in the shape measuring instrument shown in FIG. 1.
Figure 8:
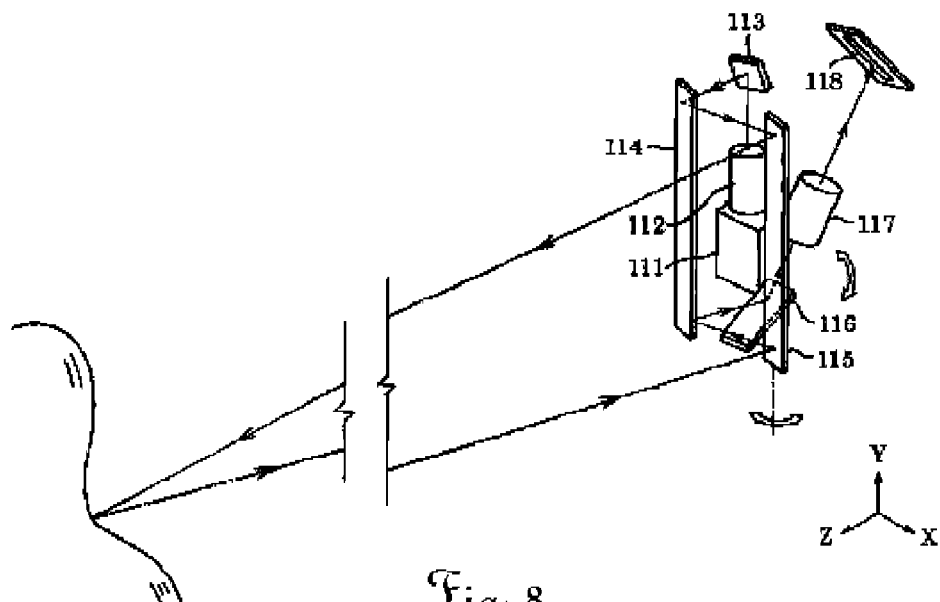
FIG. 8 is a schematic diagram of an optical system of a shape measuring device of a conventional shape measuring instrument.
Figure 9:
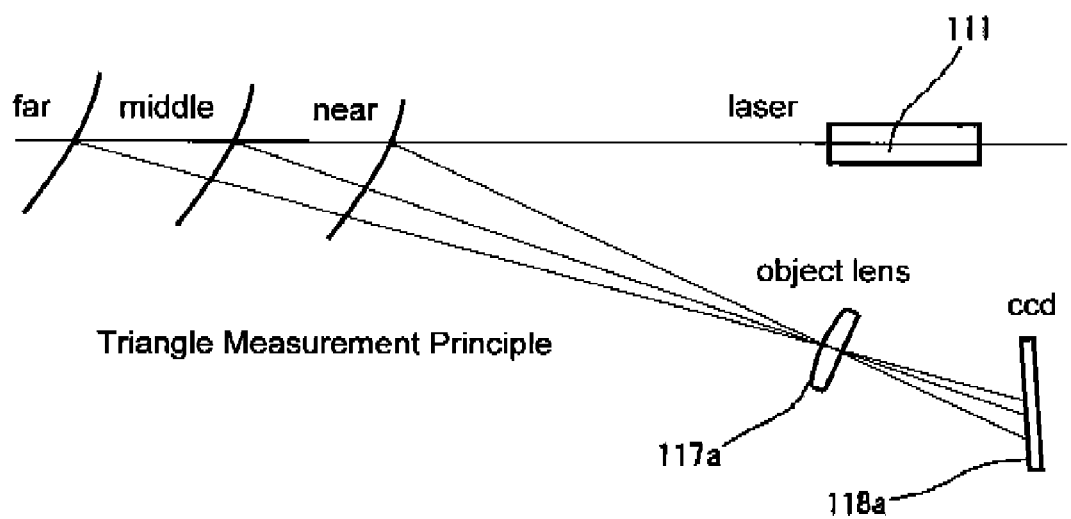
FIG. 9 is an explanatory diagram showing a measurement principle of the shape measuring instrument shown in FIG. 8.

1: optical system of shape measuring device
2, 111: laser diode
3: beam expander
4: first mirror
5: second mirror
6: swinging motor
7: third mirror
8: fourth mirror
9: fifth mirror
10, 117: imaging lens portion
10a, 117a: imaging lens
11: sixth mirror
12, 118: CCD line sensor portion
12a, 118a: line sensor
20: optical path displacing means
21: glass plate
22: fulcrum portion
23: arm
24: protrusion
25: sliding piece
26: vibration shaft
27: oscillator
112: beam expander
113: first mirror
114: second mirror
115: third mirror
116: fourth mirror

We claim:
1. A shape measuring instrument comprising:
a laser diode for emitting a laser beam;
a first optical system irradiating a surface of an object to be measured with laser beam emitted from the laser diode;
a second optical system for focusing the laser beam reflected from the surface of the object to be measured; and
a line sensor for detecting the laser beam from the second optical system, wherein the first optical system includes:
an optical path displacing unit for displacing an optical path of the laser beam such that the laser beam from the second optical system is properly focused on the line sensor, wherein the optical path displacing unit includes:
a glass plate rotatable about an axis of rotation wherein rotation causes a parallel displacement of the laser beam at the displacing unit and a displacement of the laser beam in a direction forming an angle of 90° to the line sensor at the line sensor;
a rotating unit for rotating the glass plate; and a rotating unit controller for controlling the rotating unit, wherein the rotating unit controller measures an amount of light received by the line sensor corresponding to an angle of rotation of the rotating unit and causes an angle of rotation of the rotating unit to coincide with the angle of rotation of the rotating unit obtained when the maximum value of an amount of light received by the line sensor was measured.

2. The shape measuring instrument according to claim 1, wherein the rotating unit is driven by a motor.

3. The shape measuring instrument according to claim 1, wherein the rotating unit is driven by an ultrasonic transducer.

4. The shape measuring instrument according to claim 1, wherein the line sensor for detecting the laser beam is a CCD line sensor.

5. The shape measuring instrument according to claim 1, wherein the rotating unit comprises:
   a fulcrum portion supporting the glass plate and configuring the axis of rotation;
   an arm fixed to the fulcrum portion; and
   a moving piece for rotating the fulcrum portion, wherein said moving piece is coupled to the arm and driven by a driving unit.

6. The shape measuring instrument according to claim 5, wherein driving unit includes an ultrasonic transducer.

* * * * *